US007149690B2

(12) United States Patent
August et al.

(10) Patent No.: US 7,149,690 B2
(45) Date of Patent: Dec. 12, 2006

(54) METHOD AND APPARATUS FOR INTERACTIVE LANGUAGE INSTRUCTION

(75) Inventors: Katherine Grace August, Matawan, NJ (US); Nadine Blackwood, Matawan, NJ (US); Qi P. Li, New Providence, NJ (US); Michelle McNerney, Freehold, NJ (US); Chi-Lin Shih, Berkeley Heights, NJ (US); Arun Chandrasekaran Surendran, Highland Park, NJ (US); Jialin Zhong, Berkeley Heights, NJ (US); Qiru Zhou, Scotch Plains, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 165 days.

(21) Appl. No.: 09/392,844

(22) Filed: Sep. 9, 1999

(65) Prior Publication Data

US 2003/0028378 A1 Feb. 6, 2003

(51) Int. Cl.
*G09B 5/06* (2006.01)
*G09B 17/00* (2006.01)
*G10L 15/22* (2006.01)

(52) U.S. Cl. .......................... 704/270; 704/8; 434/167; 434/185; 434/319

(58) Field of Classification Search ................ 704/270, 704/271, 272, 276, 2, 3, 5, 7; 434/185, 116, 434/167, 308, 319, 320, 321, 118, 156, 157; 345/956, 957
See application file for complete search history.

(56) References Cited

U.S. PATENT DOCUMENTS

| 4,022,974 | A |   | 5/1977  | Kohut et al. |
|-----------|---|---|---------|--------------|
| 4,787,038 | A | * | 11/1988 | Doi et al. ................. 704/2 |
| 4,884,972 | A | * | 12/1989 | Gasper ..................... 434/185 |
| 5,340,316 | A |   | 8/1994  | Javkin et al. |
| 5,487,671 | A | * | 1/1996  | Shpiro et al. .............. 434/185 |
| 5,490,061 | A | * | 2/1996  | Tolin et al. ................. 704/2 |
| 5,503,560 | A | * | 4/1996  | Stentiford ................. 434/156 |
| 5,606,644 | A |   | 2/1997  | Chou et al. |

(Continued)

FOREIGN PATENT DOCUMENTS

CA 1282954 4/1991

(Continued)

OTHER PUBLICATIONS

Leonardo Neumeyer et al., "Automatic Tex-Independent Pronunciation Scoring Of Foreign Language Student Speech," *International Conference on Spoken Language Processing, ICSLP, Proceedings*, vol. 3, pp. 1457-1460 (1996).

(Continued)

*Primary Examiner*—Martin Lerner

(57) ABSTRACT

A method and apparatus for interactive language instruction is provided that displays text files for processing, provide key features and functions for interactive learning, displays facial animation, and provides a workspace for language building functions. The system includes a stored set of language rules as part of the text-to-speech sub-system, as well as another stored set of rules as applied to the process of learning a language. The method implemented by the system includes digitally converting text to audible speech, providing the audible speech to a user or student (with the aid of an animated image in selected circumstances), prompting the student to replicate the audible speech, comparing the student's replication with the audible speech provided by the system, and providing feedback and reinforcement to the student by, for example, selectively recording or playing back the audible speech and the student's replication.

20 Claims, 10 Drawing Sheets

U.S. PATENT DOCUMENTS

| | | | |
|---|---|---|---|
| 5,634,086 A | | 5/1997 | Rtischev et al. |
| 5,649,057 A | | 7/1997 | Lee et al. |
| 5,657,426 A | * | 8/1997 | Waters et al. ............... 704/276 |
| 5,675,704 A | | 10/1997 | Juang et al. |
| 5,675,706 A | | 10/1997 | Lee et al. |
| 5,710,864 A | | 1/1998 | Juang et al. |
| 5,727,124 A | | 3/1998 | Lee et al. |
| 5,737,489 A | | 4/1998 | Chou et al. |
| 5,751,907 A | | 5/1998 | Moebius et al. |
| 5,790,978 A | | 8/1998 | Olive et al. |
| 5,797,123 A | | 8/1998 | Chou et al. |
| 5,805,772 A | | 9/1998 | Chou et al. |
| 5,878,393 A | * | 3/1999 | Hata et al. ................. 704/260 |
| 5,878,396 A | * | 3/1999 | Henton ....................... 704/276 |
| 5,885,083 A | * | 3/1999 | Ferrell ........................ 434/156 |
| 5,920,838 A | * | 7/1999 | Mostow et al. ............. 704/272 |
| 5,949,961 A | * | 9/1999 | Sharman ..................... 704/260 |
| 5,983,190 A | * | 11/1999 | Trower, II et al. .......... 704/276 |
| 6,017,219 A | * | 1/2000 | Adams, Jr. et al. ......... 704/270 |
| 6,108,627 A | * | 8/2000 | Sabourin ..................... 704/243 |
| 6,146,147 A | * | 11/2000 | Wasowicz ................... 434/118 |
| 6,226,611 B1 | * | 5/2001 | Neumeyer et al. .......... 704/246 |
| 6,250,928 B1 | * | 6/2001 | Poggio et al. ............... 434/185 |

FOREIGN PATENT DOCUMENTS

| | | |
|---|---|---|
| CA | 1314395 | 3/1993 |
| EP | 0 892 387 A1 | 1/1999 |
| EP | 0 892 388 A1 | 1/1999 |
| EP | 1 049 072 A2 | 2/2000 |
| JP | S56-153358 | 11/1987 |
| JP | H04-501617 | 3/1992 |
| JP | 6242717 | 9/1994 |
| JP | H07-5807 | 1/1995 |
| JP | 11110186 | 4/1999 |
| WO | WO 90/01203 | 2/1990 |

OTHER PUBLICATIONS

Maxine Eskenazi, "Detection Of Foreign Speakers' Pronunciation Errors For Second Language Training—Preliminary Results," *Fourth International Conference on Spoken Language Processing, Proceedings*, vol. 3, pp. 1465-1468 (1996).

"Guide To The Dictionary," *The American Heritage Dictionary, Second College Edition*, pp. 42-61 and 64 (1991).

"The Rosetta Stone Language Library," http://www.trstone.com/info/speech/main.shtml, 2 pages (printed Jun. 16, 1999).

"Voice-Interactive Language Instruction and Evaluation," http://www.speech.sri.com/projects/language_instruction.html, 1 page (printed Jul. 8, 1999).

Japanese Examiner's Office Letter, mailed May 30, 2005 (translation), 2 pages.

* cited by examiner

METHOD AND APPARATUS FOR INTERACTIVE LANGUAGE INSTRUCTION

BACKGROUND OF THE INVENTION

This invention relates to a method and apparatus for interactive language instruction. More particularly, the invention is directed to a multi-media and multi-modal computer application that displays text files for processing, provides features and functions for interactive learning, displays facial animation, and provides a workspace for language building functions. The system includes a stored set of language rules as part of the text-to-speech subsystem, as well as another stored set of rules as applied to the process of learning a language. The method implemented by the system includes digitally converting text to audible speech, providing the audible speech to a user or student (with the aid of an animated image in selected circumstances), prompting the student to replicate the audible speech, comparing the student's replication with the audible speech provided by the system, conducting performance analysis on the speech (utterance) and providing feedback and reinforcement to the student by, for example, selectively recording or playing back the audible speech and the student's replication.

While the invention is particularly directed to the art of interactive language instruction, and will be thus described with specific reference thereto, it will be appreciated that the invention may have usefulness in other fields and applications. For example, the invention may be used to teach general speech skills to individuals with speech challenges or may be used to train singers to enhance vocal skills.

By way of background, interactive language instruction programs are known. For example, U.S. Pat. No. 5,634,086 to Rtischev et al. is directed to a spoken language instruction method and apparatus employing context based speech recognition for instruction and evaluation. However, such known language instruction systems require the use of recorded speech as a model with which to compare a student's attempts to speak a language sought to be learned.

Work involved with preparing the lesson as recorded speech (such as preparing a script) includes recording phrases, words, etc., creating illustrations, photographs, video, or other media, and linking the sound files with the images and with the content of the lessons or providing large databases of alternative replies in dialogue systems which are designed to replicate interactions with students for context based lessons, etc.

Moreover, language students may be interested in learning words, phrases, and context of a particular interest such as industry specific terms from their workplace (computer industry, communications, auto repair, etc.). Producing such special content is difficult using recorded speech for the language lesson.

Other difficulties with using recorded speech in this context are numerous. The quality of the recording medium may present problems. In this regard, an excessive amount of background noise in the recording may affect the quality thereof. In addition, recorded speech is subject to many other factors that may undesirably enter the speech model. For example, recorded speech may include speaker accents resulting from the speaker being a native of a particular geographic area. Likewise, recorded speech may reflect a particular emotional state of the speaker such as whether speaker is tired or upset. As a result, in any of these circumstances, as well as others, the shortcomings of recorded speech make it more difficult for a student to learn a language lesson.

A few products exist which allow users to process files of text to be read aloud by synthesized or recorded speech technologies. These products are commonly known as text-to-speech engines. See, for example, U.S. Pat. No. 5,751,907 to Moebius et al. (issued May 12, 1998) and U.S. Pat. No. 5,790,978 to Olive et al. (issued Aug. 4, 1998), both of which are incorporated herein by reference. Some existing products also allow users to add words to a dictionary, make modifications to word pronunciations in the dictionary, or modify the sound created by a text-to-speech engine. See, for example, U.S. application Ser. No. 09/303,057, entitled "Graphical User Interface and Method for Modifying Pronunciations in Text-To-Speech and Speech Recognition Systems" which was filed Apr. 30, 1999 on behalf of August and McNerney (Case Name and No: August 23-7), which is incorporated herein by reference.

Voice or speech recognition systems are also known. These systems use a variety of techniques for recognizing speech patterns including utterance verification or verbal information verification (VIV), for which a variety of patents owned by Lucent Technologies have been applied for and/or issued. Among these commonly assigned patents/applications are U.S. Pat. No. 5,797,123 to Chou et al. (filed Dec. 20, 1996; issued Aug. 18, 1998); U.S. application Ser. No. 896,355 to B. Juang, C. Lee, Q. P. Li, and Q. Zhou filed on Jul. 18, 1997 (and corresponding application EP 892 387 A1 published on Jan. 20, 1999); U.S. application Ser. No. 897,174 to B. Juang, C. Lee, Q. P. Li, and Q. Zhou filed on Jul. 18, 1997 (and corresponding application EP 892 388 A1 published on Jan. 20, 1999); and U.S. Pat. No. 5,649,057 to Lee et al. (filed Jan. 16, 1996; issued Jul. 15, 1997), all of which are incorporated herein by this reference.

It would be desirable to have available an interactive language instruction program that did not rely exclusively on recorded speech and utilized reliable speech recognition technology, such as that which incorporates utterance verification or verbal information verification (VIV). It would also be desirable to evaluate a speaker's utterance with predictive models in the absence of a known model. The system would provide a confidence measure against any acoustic model from which a score can be derived. It would also be desirable to have available such a system that selectively incorporates facial animation to assist a student in the learning process.

The present invention contemplates a new and improved interactive language instructor which resolves the above-referenced difficulties and others.

SUMMARY OF THE INVENTION

A method and apparatus for voice interactive language instruction is provided.

In one aspect of the invention, a system comprises a first module configured to digitally convert input text to audible speech in a selected language, a user interface positioned to receive utterances spoken by a user in attempting to replicate the audible speech, and a second module configured to recognize the utterances and provide feedback to the user as to an accuracy at which the user replicates the speech in the selected language based on a comparison of the utterances to the audible speech, any acoustic model, predictive models, phoneme models, diphone models, or dynamically generated models.

In a more limited aspect of the invention, a third module is provided which is synchronized to the first module and which provides an animated image of a human face and head pronouncing the audible speech.

In another aspect of the invention, the animated image of the face and human head portrays a transparent face and head.

In another aspect of the invention, the animated image of the face and human head portrays a three dimensional perspective and the image can be rotated, tilted, etc. for full view from various angles.

In another aspect of the invention, the first and third modules further include controls to control one of volume, speed, and vocal characteristics of the audible speech and the animated image.

In another aspect of the invention, the model is one of a predictive model, phoneme model, a diphone model, and a dynamically generated model.

In another aspect of the invention, the first module includes files storing model pronunciations for the words or sub-words comprising the input text.

In another aspect of the invention, the system comprises lesson files upon which the input text is based.

In another aspect of the invention, the input text is based on data received from a source outside of the system.

In another aspect of the invention, the system further includes dictionary files.

In another aspect of the invention, the system further comprises a record and playback module.

In another aspect of the invention, the system includes a table storing mapping information between word subgroups and vocabulary words.

In another aspect of the invention, the system includes a table for storing mapping information between words and vocabulary words.

In another aspect of the invention, the system includes a table for storing mapping information between words and examples of parts of speech.

In another aspect of the invention, the system includes a table of punctuation.

In another aspect of the invention, the system includes a table of sub-words and corresponding sub-words in another language. For word sound drill, for example, when learning a first language (given a student who natively speaks a second language), sub-words from the first language may be mapped to sub-words in the second language, to illustrate sound alike comparison to the student. The sub-word table will also be used to locate and display/play vocabulary words using the sub-word from either language.

In another aspect of the invention, a method is provided that includes converting input text data to audible speech data, generating audible speech comprising phonemes or diphones based on the audible speech data, generating an animated image of a face and head pronouncing the audible speech, synchronizing the audible speech and the animated image, prompting the user to attempt to replicate the audible speech, recognizing utterances generated by the user in response to the prompt, comparing the phonemes or diphones to the utterances, and providing feedback to the user based on the comparison.

In another aspect of the invention, a series of sentences is provided which represent the basic inventory of phonemes and diphones in a language. The student will read the sentences and they will be recorded. The sub-words will be analyzed to determine baseline score or starting performance of the student. This may be used to determine progress, to establish a level for exercises, or to identify areas to work on.

In another aspect of the invention, a table of reference scores is provided for grade levels in language classes given populations of students. The student progress can be measured and graded on an individual basis or as compared with the population of choice.

In another aspect of the invention, a score for student's speech will be provided in sub-words, words, sentences, or paragraphs. Student can receive an overall score, or a score on individual parts of the speech.

In another aspect of the invention, normalization issues regarding verification of speech are managed through the interface. Given speech of differing duration, and complexity, the animated cursor on the screen can be set by the system or by the student. When the student reads along with the animated cursor, the verification process can correlate the text which is highlighted with the sound file to be analyzed.

In another aspect of the invention, certain recorded sounds can be interjected for emphasis of natural sound for known sub-words or words of a given language. These words may be taken from a previously recorded dictionary, application, or other resource.

In another aspect of the invention, baseline scores are recorded in a table. The table is used to determine appropriate level of lesson to be selected for the student. With this table, the system can automatically use the same text, content, etc. for students of different abilities by modifying thresholds of confidence measurement.

In another aspect of the invention, the teacher or student can use the graphical user interface to establish or modify thresholds for the confidence measurement, grade level, or other attributes.

In another aspect of the invention, the student registers identification, baseline score, and subsequent lesson scores to achieve customized lessons and to track progress.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION OF THE PREFERRED EMBODIMENTS

Figure 1:
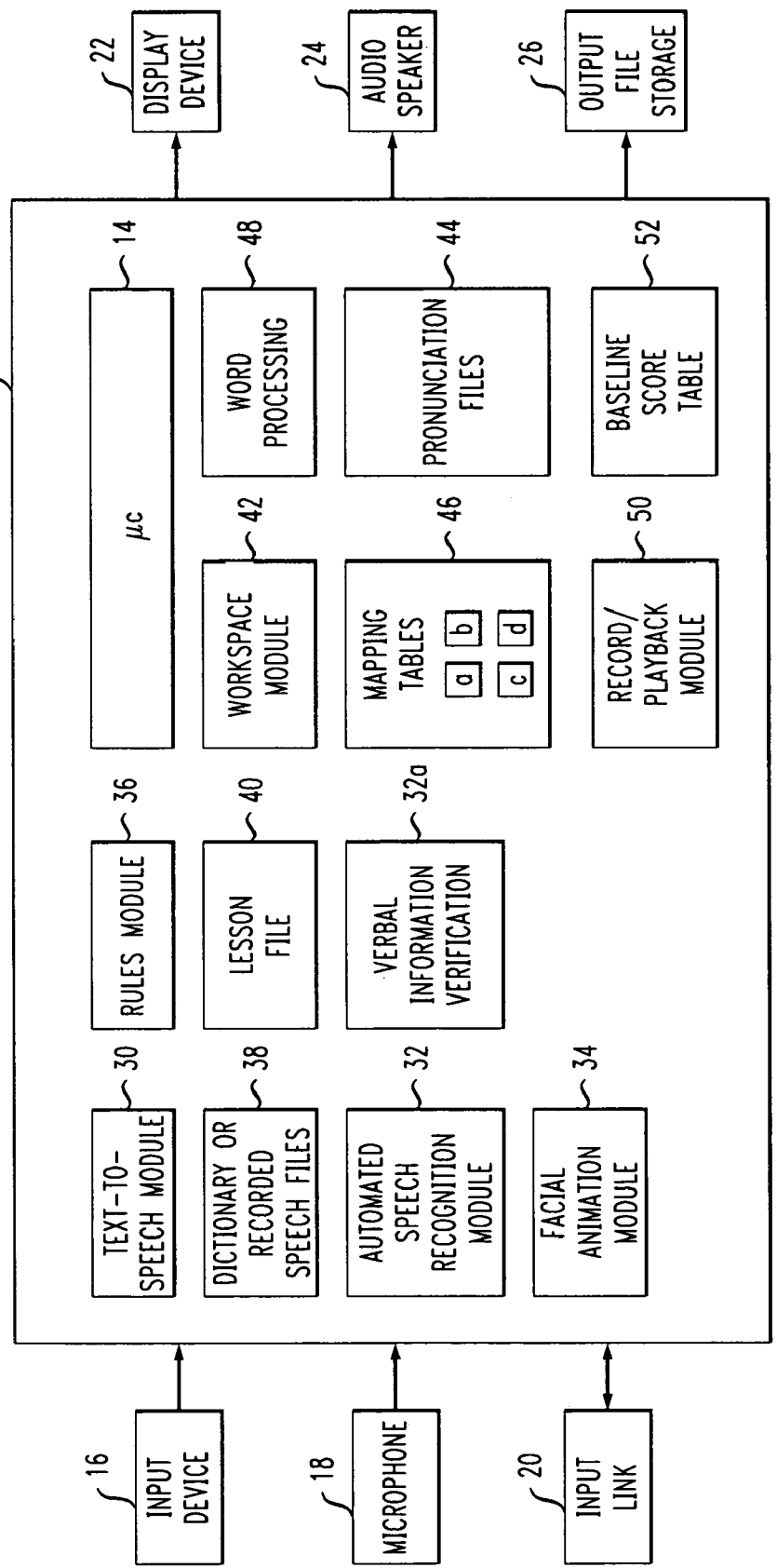
FIG. 1 is a schematic illustration of a system according to the present invention.

Referring now to the drawings wherein the showings are for purposes of illustrating the preferred embodiments of the invention only and not for purposes of limiting same, FIG. 1 provides a view of the overall preferred system according to the present invention. As shown, an interactive language instruction system 10 is provided. The system 10 includes a computerized apparatus or system 12 having a microcontroller or microprocessor 14. The system 10 further has one or more input devices 16 such as a keyboard, mouse, etc., a microphone 18, an input link 20, one or more display devices 22, an audio speaker 24 and an output file interface unit 26. All such components are conventional and known to those of skill in the art and need not be further described here. Moreover, it should be appreciated that the system 10 in suitable form may also be incorporated in and/or compatible with client-server and slim client architectures. It is to be further appreciated that the system could be provided and deliverable through compact disks, the Internet, or downloadable to a smaller or more mobile device.

The system 12 includes a variety of components which may be incorporated therein as shown or may be remotely located from computer 12 and accessible over a network or other connection in accordance with the present invention. As shown, the system 10 includes a text-to-speech module, or TTS module, 30 and an automated speech recognition module, or ASR module, 32. These modules are conventional and known to those of skill in the art. Preferably, the TTS module 30 incorporates teachings of, for example, U.S. Pat. No. 5,751,907 to Moebius et al. (issued May 12, 1998) and U.S. Pat. No. 5,790,978 to Olive et al. (issued Aug. 11, 1998), and the ASR module (including the verbal information verification portion 32a) incorporates, for example, the teachings of U.S. Pat. No. 5,797,123 to Chou et al. (filed Dec. 20, 1996; issued Aug. 18, 1998); U.S. application Ser. No. 896,355 to B. Juang, C. Lee, Q. P. Li, and Q. Zhou filed on Jul. 18, 1997 (and corresponding application EP 892 387 A1 published on Jan. 20, 1999); U.S. application Ser. No. 897,174 to B. Juang, C. Lee, Q. P. Li, and Q. Zhou filed on Jul. 18, 1997 (and corresponding application EP 892 388 A1 published on Jan. 20, 1999); and, U.S. Pat. No. 5,649,057 to Lee et al. (issued Jul. 15, 1997), all of which are incorporated herein by this reference. The TTS module 30 converts text stored as digital data to audio signals for output by the speakers 24 in the form of phonemes and the ASR module 32 converts audio signals received through microphone 18 into digital data. Also provided to the system is an animation module 34.

The TTS module 30 has associated therewith a rules module 36 for facilitating the conversion of the text to audible speech. More specifically, the rules module 36 has stored therein code that allows multilevel analysis of the words for which conversion to audible speech is sought. The rules module sequentially analyzes a selected word, analyzes the word in the context of the sentence (e.g. analyzes the surrounding words or the part of speech (e.g. determines whether "address" is a noun or a verb)), and then analyzes the sentence format (e.g. determines whether the sentence is a question or a statement). This analysis scheme facilitates a more accurate pronunciation of each word (e.g. proper emphasis) in the context in which the word is used. The TTS module 30 is also in communication with a dictionary file or recorded dictionary 38 to facilitate proper pronunciation of selected words and, of course, a lesson file 40 from which text for lessons is retrieved. It is to be appreciated the lesson text may also be obtained through input link 20 from various other sources including the Internet, LANs, WANs, scanners, closed caption devices, etc. This feature allows the content of the lessons to be separated from the functions of the system. That is, the system and method of the present invention can be applied to different lesson content to suit the needs and/or desires of the user or student.

The preferred TTS module or engine includes therein model pronunciations of all words and sub-words entered in text. These model files are ultimately used to compare with the words spoken by the student, as will be described in greater detail below. Any word in a dictionary or file can be used with the system of the present invention. In other language learning products, lessons are limited to the recorded words and phrases. The preferred TTS module provides the capability to recognize text or a text file and process it, converting it to audible speech. The preferred addition of a TTS module provides flexibility for lesson production in that it repurposes other materials, current events, news stories, web content, files, specialized documents, etc. and provides the ability to apply the application to special needs situations such as speech therapy where customized word practice is desirable.

For a language student, the preferred TTS module provides examples of text pronounced according to the rules of speech in that language. The vocal quality of the TTS module is preferably extremely high. The student can thus listen to the pronunciations of any word in the dictionary or file even when a native English speaker is not available, and without requiring that the words used in lessons be previously recorded and stored in the system. Inflections and tonal variations common to language in context are included in the system which would be difficult to do with recorded speech. The TTS module also accommodates regional accents through the addition of specific pronunciation files which may be used in a specific context to demonstrate pronunciation alternatives including but not limited to: American, regional American, English pronunciation of Spanish words, proper names, trademark and technical words, etc.

The ASR module 32 includes a verbal information verification (VIV) portion 32a for providing utterance verification to the ASR module 32. This preferred form of the ASR module having the verbal information verification (VIV) portion compares the output of phonemes processed by the TTS engine and voice, its own acoustic model or any derived acoustic model, or utterances, spoken by the student. The VIV portion analyzes the similarity with which a speaker matches the file created by the TTS module 30. This comparison provides the basis of the feedback to the student. An overall score is offered to the student for feedback. In addition, individual word parts or phoneme matches are analyzed to indicate where precisely the student may be having difficulty in pronunciation. Feedback is provided to the student for each portion of the speech created. Reinforcement for pronunciation is provided to the student based upon rules of the language, identification of the word or word segment identified, known pronunciation problems carried from the student's native language, and the student's level of achievement.

The animation module 34 provides visual aid to a student. The module 34 is synchronized with the TTS module 30, retrieves text files and, together with the TTS module or engine, pronounces the word for the student through an animated image of a human head and face. Preferably, the animated image of the face and human head portrays a three-dimensional perspective and the image has the capability of being rotated, tilted, etc. for full view from various angles. Accordingly, the student can observe characteristics of facial and mouth movements, and placement of the tongue, lips and teeth during speech examples. The animation module synchronizes the facial movement with processing of the TTS module in manners that are well known to those of skill in the art. The student can observe the animated image, or teacher, from any angle, with normal or transparent mode to further observe teeth and tongue placement. The teacher example can be modified. Volume, speed, and vocal characteristics of the teacher may be changed by the student using the computer interface. Voice may be male or female, high or lower, fast or slower. As will be described hereafter, reinforcement will be provided to the student based upon rules of the language, known pronunciation problems carried from the student's native language and the student's level of achievement.

The system 10 also includes a workspace module 42 that generates and facilitates processing in a viewable workspace on the display device 22. The workspace module 42 is linked to a pronunciation module 44, mapping tables 46, word processing module 48 and record and playback module 50.

The pronunciation module 44 includes databases containing records for words, word subgroups, vocabulary words used to teach typical sounds in a language, examples from parts of speech used to teach contextual pronunciation of words and tables of punctuation. The sample words are selected in creating the pronunciation databases based on grammatical and linguistic rules for the language. Preferably, the sample words for each character or character group (e.g. dipthong) are ordered generally from more common usage in pronunciation of the character to a less common usage. The module 44 also accommodates regional accents through the addition of specific pronunciation files which may be used to establish a profile in a specific context to demonstrate pronunciation alternatives including but not limited to: American, regional American, English pronunciation of Spanish words, proper names, trademark and technical words, etc.

The mapping tables 46 include tables 46a having stored therein mappings between the word sub-groups and the vocabulary words used to teach typical sounds in a language, tables 46b having stored therein mappings between the words and the vocabulary words used to teach typical sounds in a language, and tables 46c having stored therein mappings between the words and the examples from parts of speech to teach contextual pronunciation of words. The system also includes tables 46d storing examples of punctuation typically used in a language that may be used in lessons independently, or in the context of a sub-word, word, or group.

Figure 2:
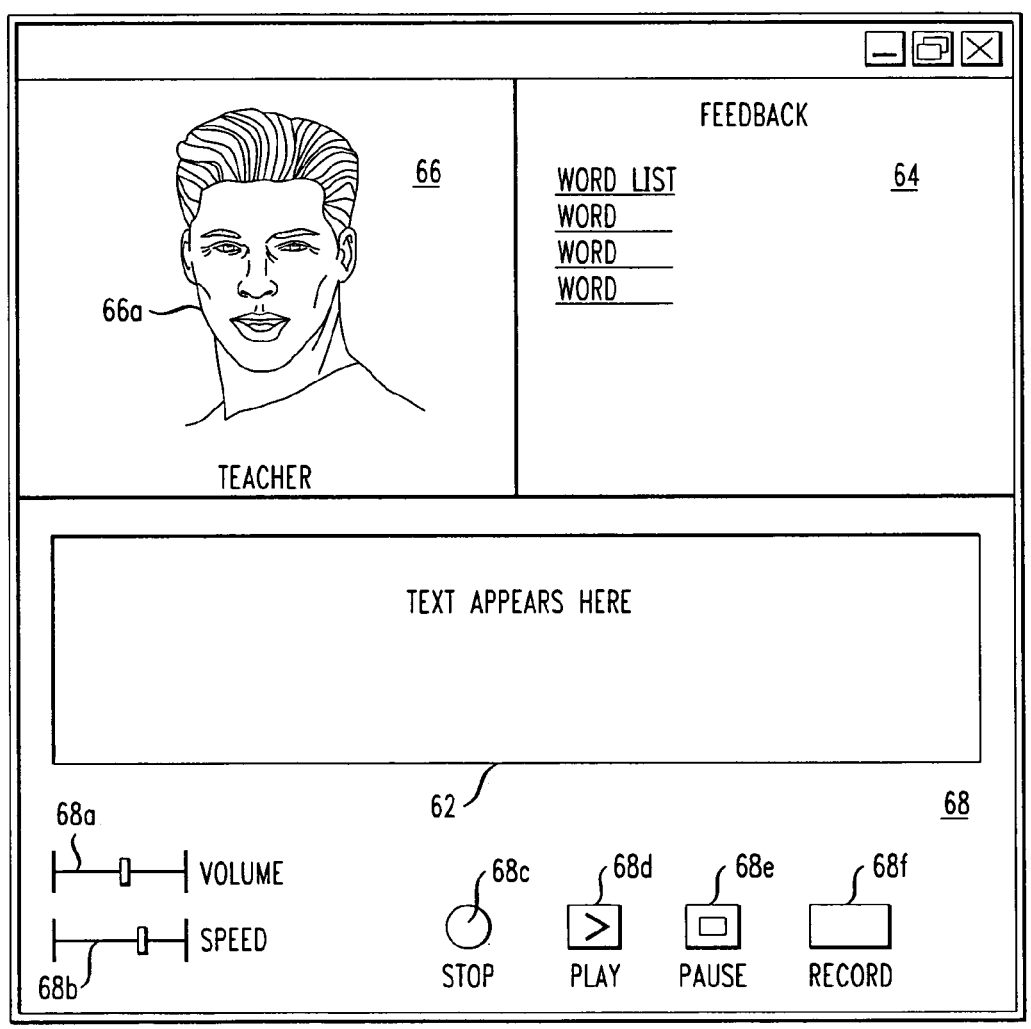
FIG. 2 is an illustration of a window generated to facilitate interactive learning according to the present invention.

Referring now to FIG. 2, a representative view of the primary window generated by the system 10 and appearing to the user is shown. The window 60 includes a workspace 62 associated with the workspace module 42, a feedback area 64 primarily associated with the ASR module, an animation area 66 primarily associated with the animation module, and a control area 68 primarily associated with the TTS module and the animation module. The workspace 62 facilitates display and manipulation of text for lessons for the student. The feedback area 64 facilitates display and manipulation of feedback provided to the student by the system, as will be hereafter described. The animation area includes, as shown, an exemplary animated face and head 66a. Last, the control area includes user interface control icons such as volume adjustment 68a, speed adjustment 68b, a stop button 68c, a play button 68d, a pause button 68e, and a record button 68f. The student interactively manipulates the window 60 to perform functions according to the present invention.

Figure 3:
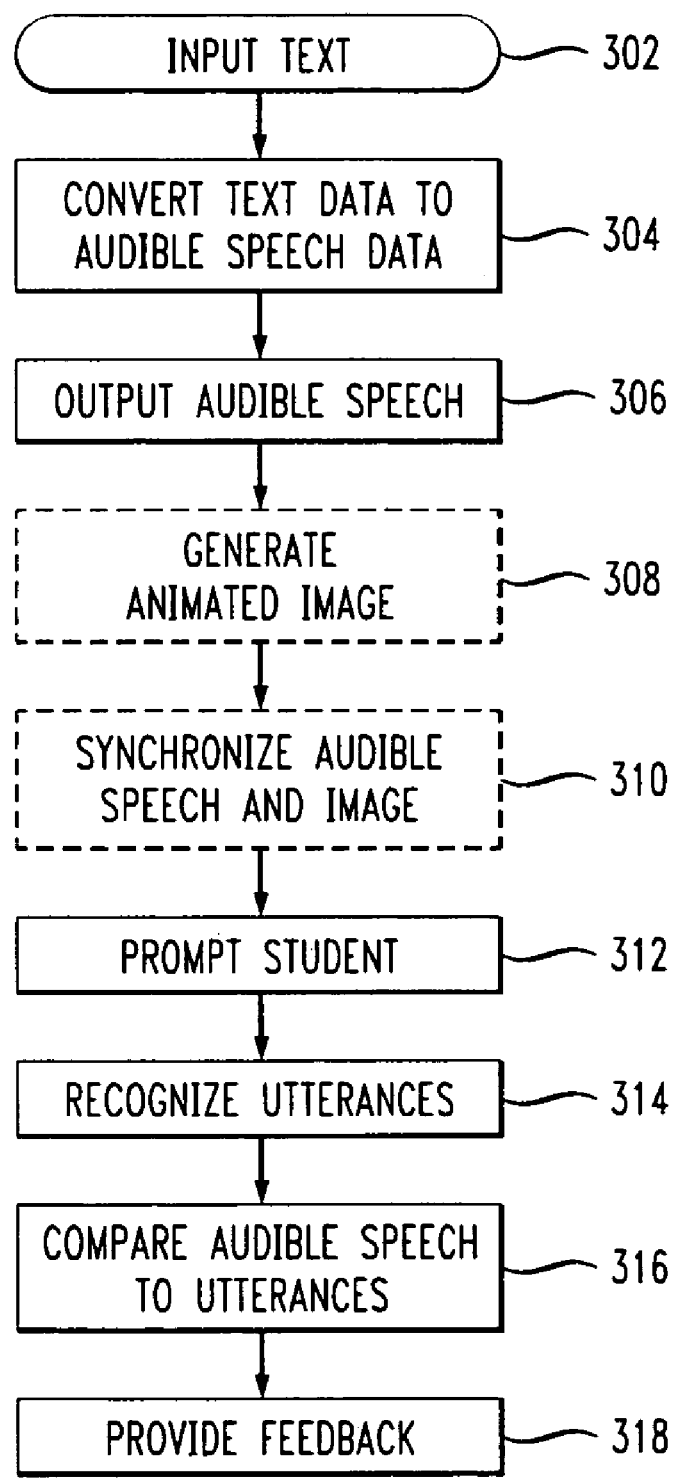
FIG. 3 is a flowchart of the overall method according to the present invention.

The overall method of the preferred embodiment is illustrated in FIG. 3. It is to be appreciated that the methods described in connection with FIG. 3, as well as FIGS. 4–11, are implemented using hardware and software techniques that will be apparent to those of skill in the art upon a reading of the disclosure hereof.

As shown, the method 300 is initiated with the input of text (step 302) and subsequent conversion of the input text to audible speech data (step 304). Audible speech is generated and output based on the audible speech data (step 306). Of course, the audible speech can also be represented by a variety of models including predictive models, phoneme models, diphone models or dynamically generated models. These models are generated primarily by the ASR module and associated elements. However, in certain circumstances, the TTS module may also be used to generate the acoustic models. When desired by the student, an animated image of a human face and head is then generated primarily by the facial animation module 34 (step 308) and the audible speech and animated image are synchronized (step 310). A student is then prompted to replicate the audible speech with spoken words, or utterances (step 312). The system then recognizes the utterances of the student (step 314) and compares these utterances to the audible speech data primarily through the module 32 (including portion 32a) (step 316). Feedback is then provided to the student based on the comparison and a confidence measure which is correlated to customized scoring tables and used as a calibration point, as is known in the art, in a variety of manners as described below (step 318). The feedback preferably reflects the precision at which the user replicates the audible speech in the selected language.

Figure 4:
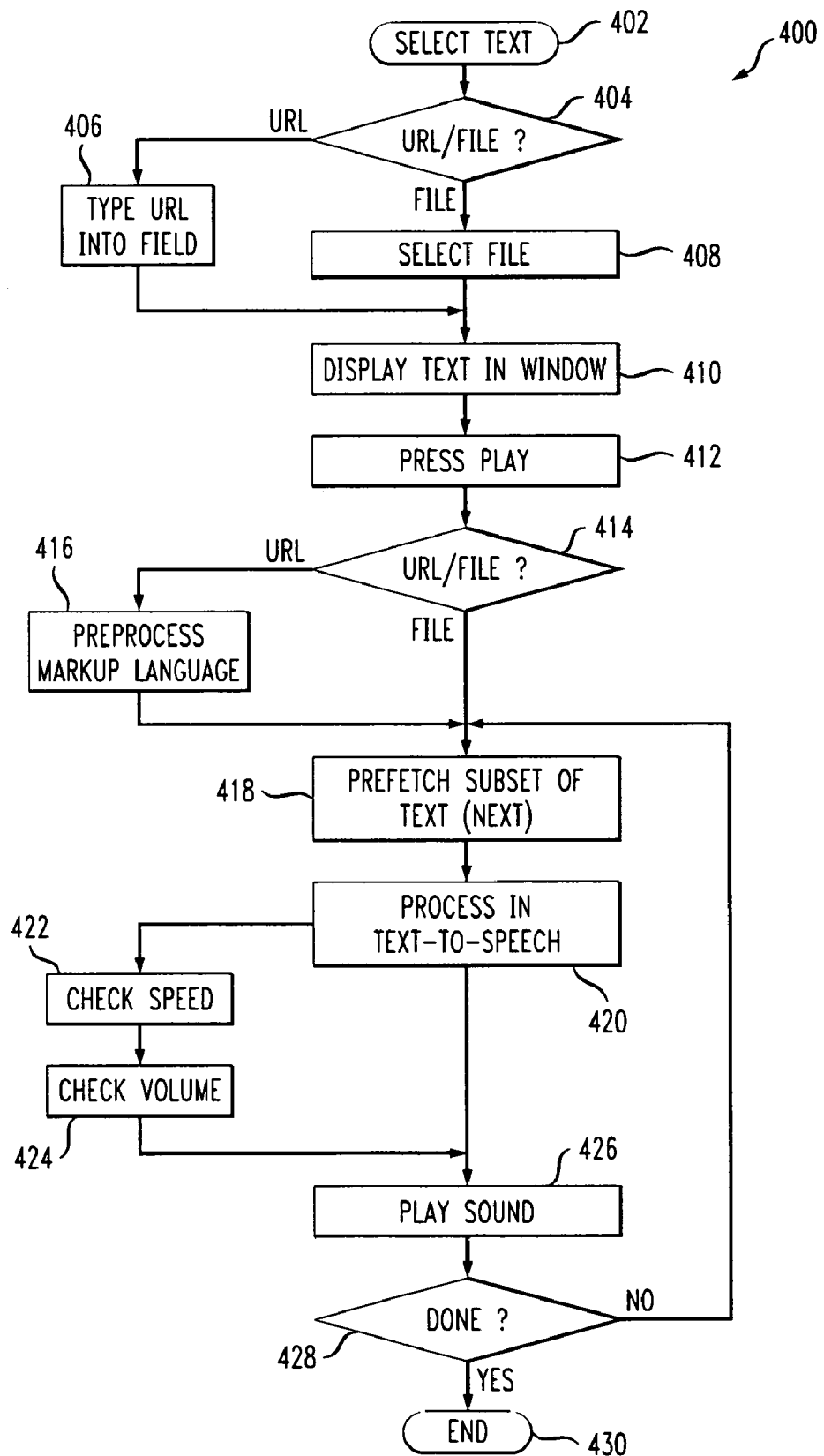
FIG. 4 is a detailed flowchart of a text selection and audible speech generation method according to the present invention.

FIG. 4 provides a more detailed description for steps 302, 304, and 306. More particularly, a submethod 400 includes the selection of input text (step 402) followed by retrieval of the text using either a Universal Resource Locator (URL) or a stored filed (step 404). If a URL is used, the URL is typed into the field and the text is retrieved (step 406). If the text is stored in a file, the file is selected (step 408). In either event, the retrieved text is displayed in the workspace 62 (step 410). The play button 68d is then pressed, or "clicked on" (step 412). A determination is made whether the selected text originated from a source located using a URL or a file (step 414). If the text originated by way of a URL, the markup language is preprocessed (step 416). The text may be preprocessed to present ideal form for TTS processing, for example, removing any markup language, textual illustrations, parsing known or provisioned formats such as email, faxes, etc. In either case, a subset of the text is then prefetched (step 418) and text-to-speech processing is initiated (step 420). Optionally, the speed and volume of the speech is checked (steps 422 and 424). The sound is then played (step 426) and a determination is made whether the playing of the audible speech is complete (step 428). If the playing of the audible speech is not complete, steps 418 to 428 are repeated. If the playing of the audible speech is completed, the process ends (step 430).

Figure 5:
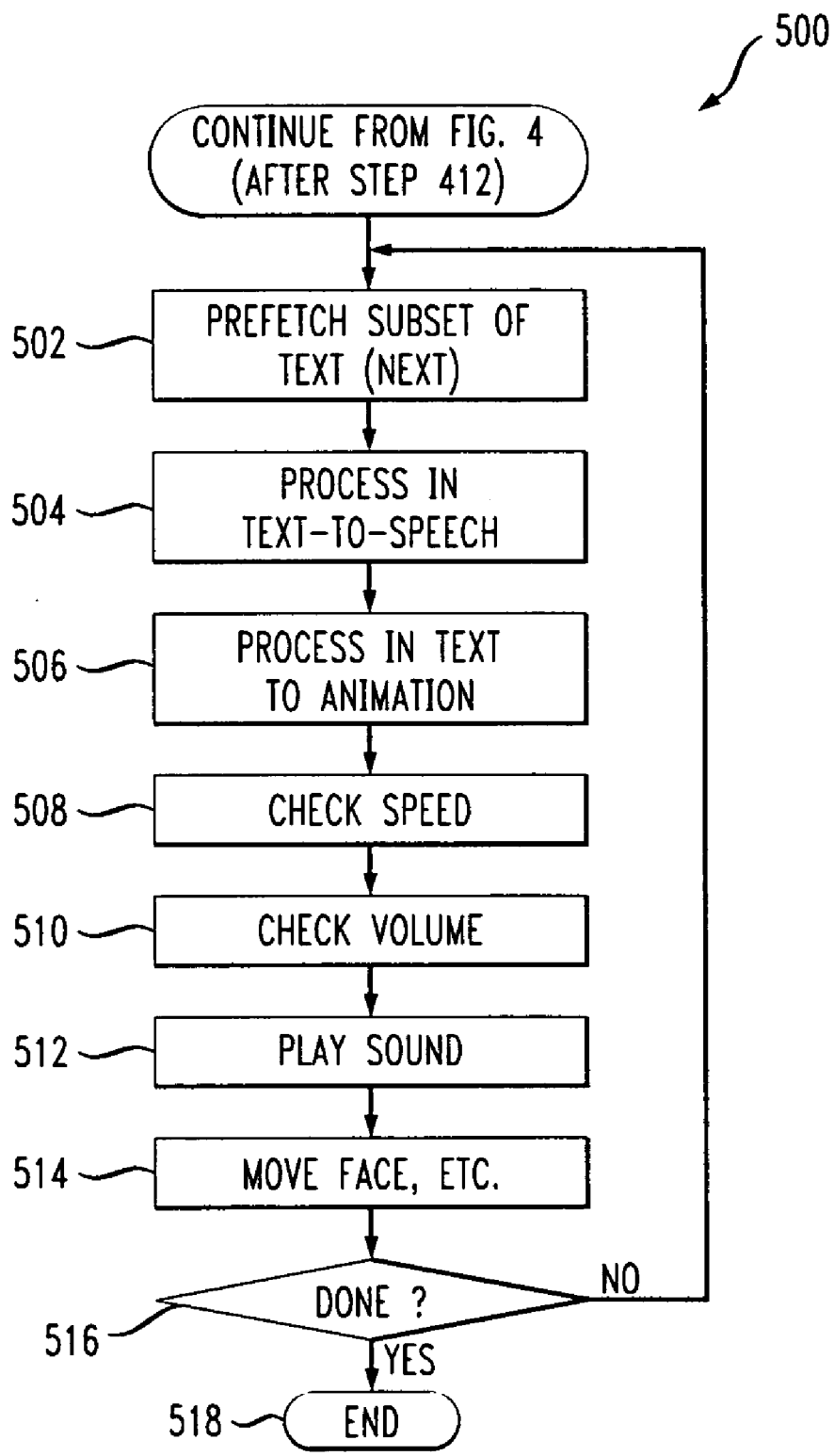
FIG. 5 is a detailed flowchart of a text selection, animation and audible speech generation method according to the present invention.

In a situation where animation is used (e.g. a teacher prompt), a detailed description of steps 302 through 310 of FIG. 3 is shown in FIGS. 4 and 5. For brevity, submethod 500 simply replaces steps 418 to 430 of FIG. 4.

Referring now to FIG. 5, after the play button 68*d* is pressed, the subset of the selected text is prefetched (step 502). Text-to-speech processing is then initiated (step 504). Text animation processing is also initiated (step 506). The speed and volume are then checked (steps 508 and 510) and adjusted if necessary. The sound and facial movements are output to the user in the animation area 66 (steps 512 and 514). A determination is then made whether the playing of the audible speech with animation is completed (step 516). If not complete, steps 502 to 516 are repeated. If playing of the audible speech with the animation is complete, the process is ended (step 518).

Referring back to FIG. 3, the student is prompted at step 312 to replicate the audible speech played. In this regard, the student may be actively or passively prompted by the system to repeat the teacher's example. Methods of prompting include a moving cursor, moving highlighted area of text, or moving icon. Audible prompts may be used including but not limited to: stating "repeat after me" and then stating the word to be repeated. The speed of the prompt is also adjustable.

The student may choose to record his or her attempts at speech during a lesson. The student can listen to the teacher and his or her recording for a side-by-side comparison. The recording can also be used by the Automated Speech Recognition function to determine the student's performance as will be described below.

Figure 6:
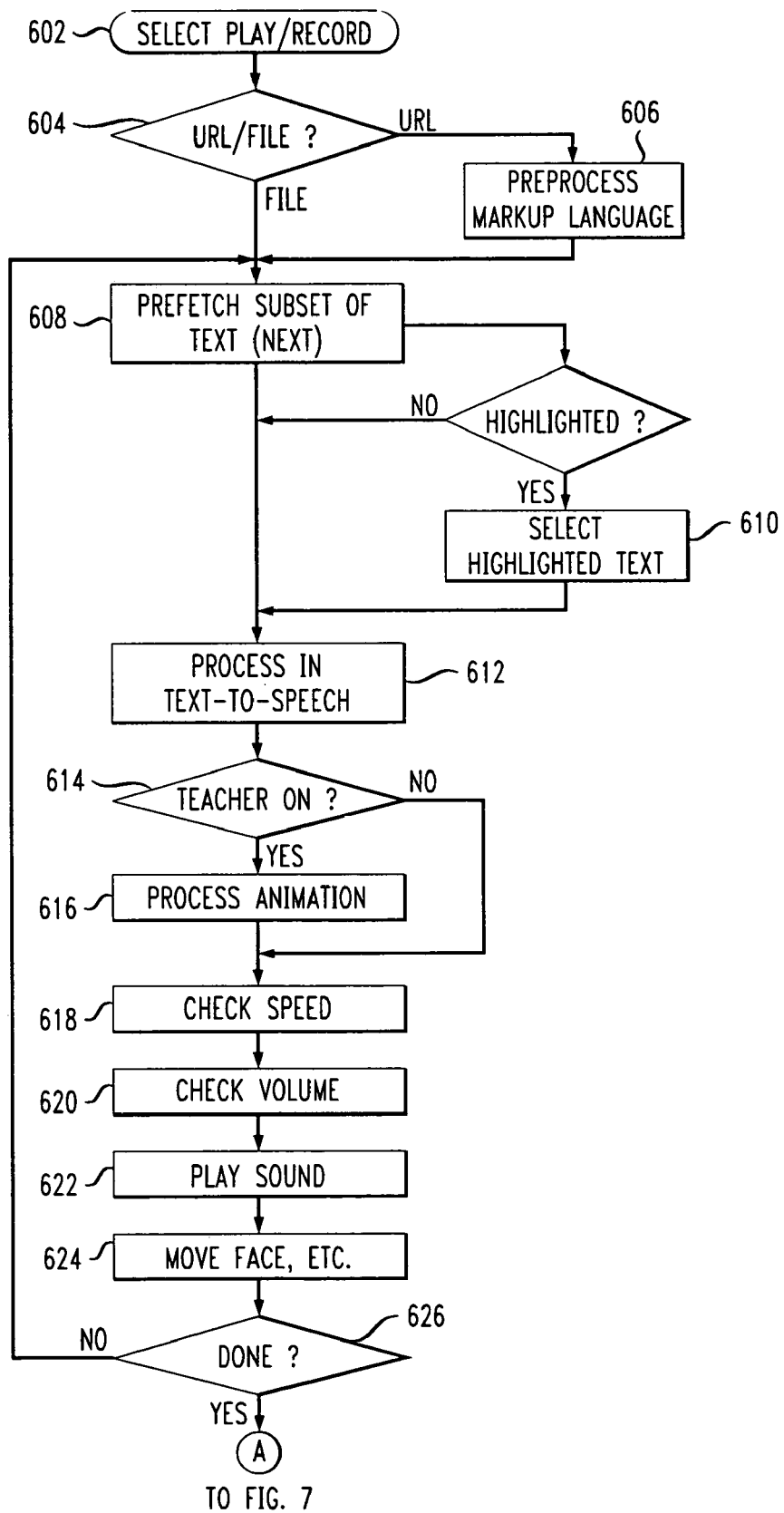
FIG. 6 is a detailed flowchart of a recording method according to the present invention.

As shown in FIG. 6, the recording method is initiated by selecting (or pressing or "clicking on") the play button 68*d* and record button 68*f* (step 602). A determination is then made whether the sought text file is stored or should be retrieved by way of a URL (step 604). If a URL is involved, the markup language must be preprocessed (step 606). The text is then prefetched (step 608) and highlighted text is particularly selected (step 610). In either case, text-to-speech processing is initiated (step 612) and then a determination is made whether animation should be used (step 614). If animation is desired, the animation data is processed (step 616). Whether the animation is processed or not, the speed and volume are checked (steps 618 and 620). The sound is then played along with the animation, if desired (steps 622 and 624). A determination is made whether the playing is done (step 626). If the process is not complete, steps 606–626 are repeated.

Figure 7:
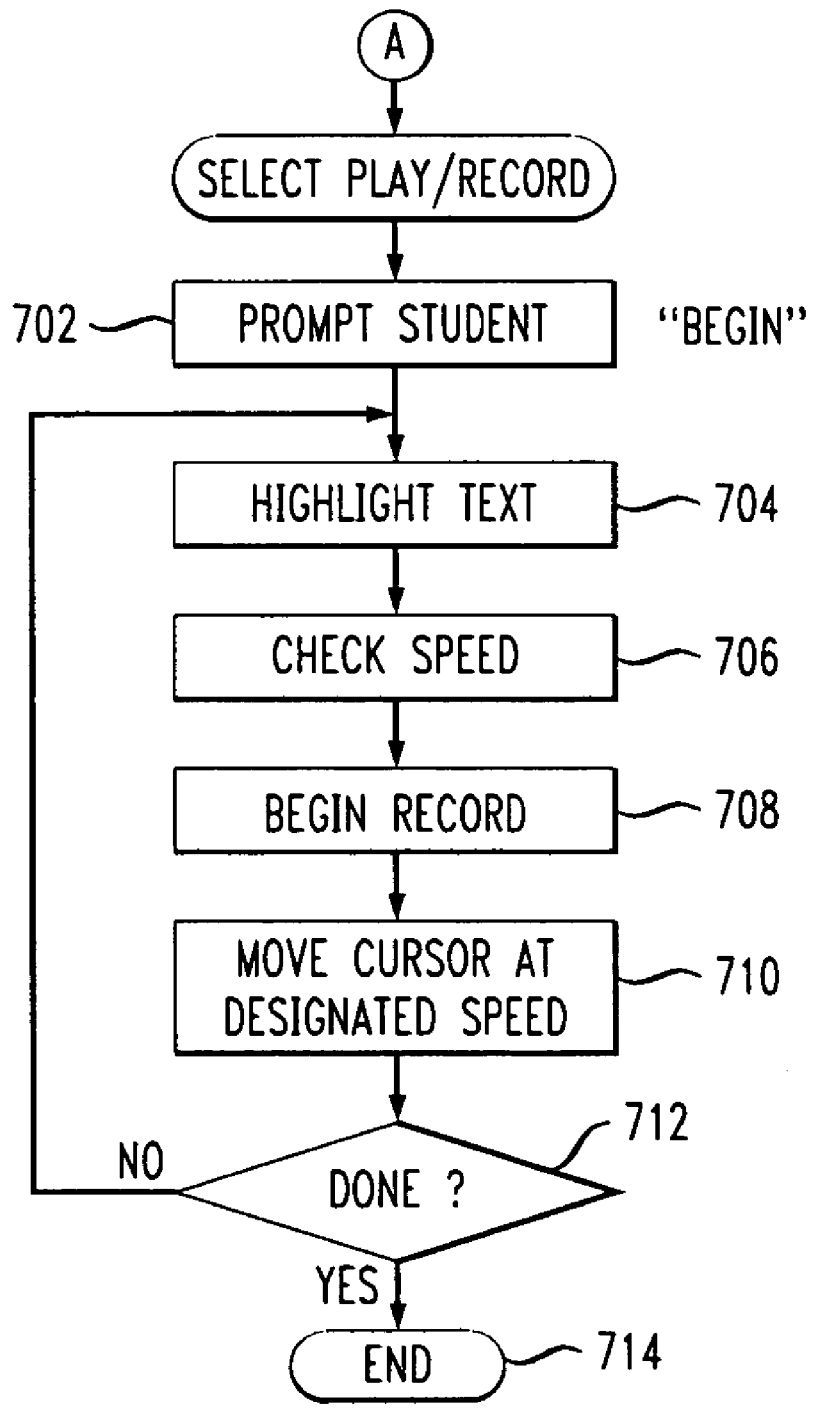
FIG. 7 is a detailed flowchart of another recording method according to the present invention.

If playing is completed, as shown in FIG. 7, a prompt to the student is made by the system (step 702). Text for student replication is highlighted (step 704). The speed is checked (step 706). Recording of the student is begun (step 708) and the cursor is moved at a designated speed (step 710). A determination is then made whether the process is complete (step 712). If not, steps 702 to 712 are repeated. If the process of recording is complete, the process is ended (step 714).

Referring back to FIG. 3, the system recognizes the utterances, compares them to the audible speech files or records for which models can be generated, and provides feedback (steps 314, 316, 318). With respect to the step 316, as will be appreciated by those skilled in the art, the comparison could occur between the utterances and any of the following: audible speech, any acoustic model, predictive module, phoneme models, diphone models, or dynamically generated models. The feedback may be provided in a variety of manners. One form of feedback is to allow the student to playback the lesson.

Figure 8:
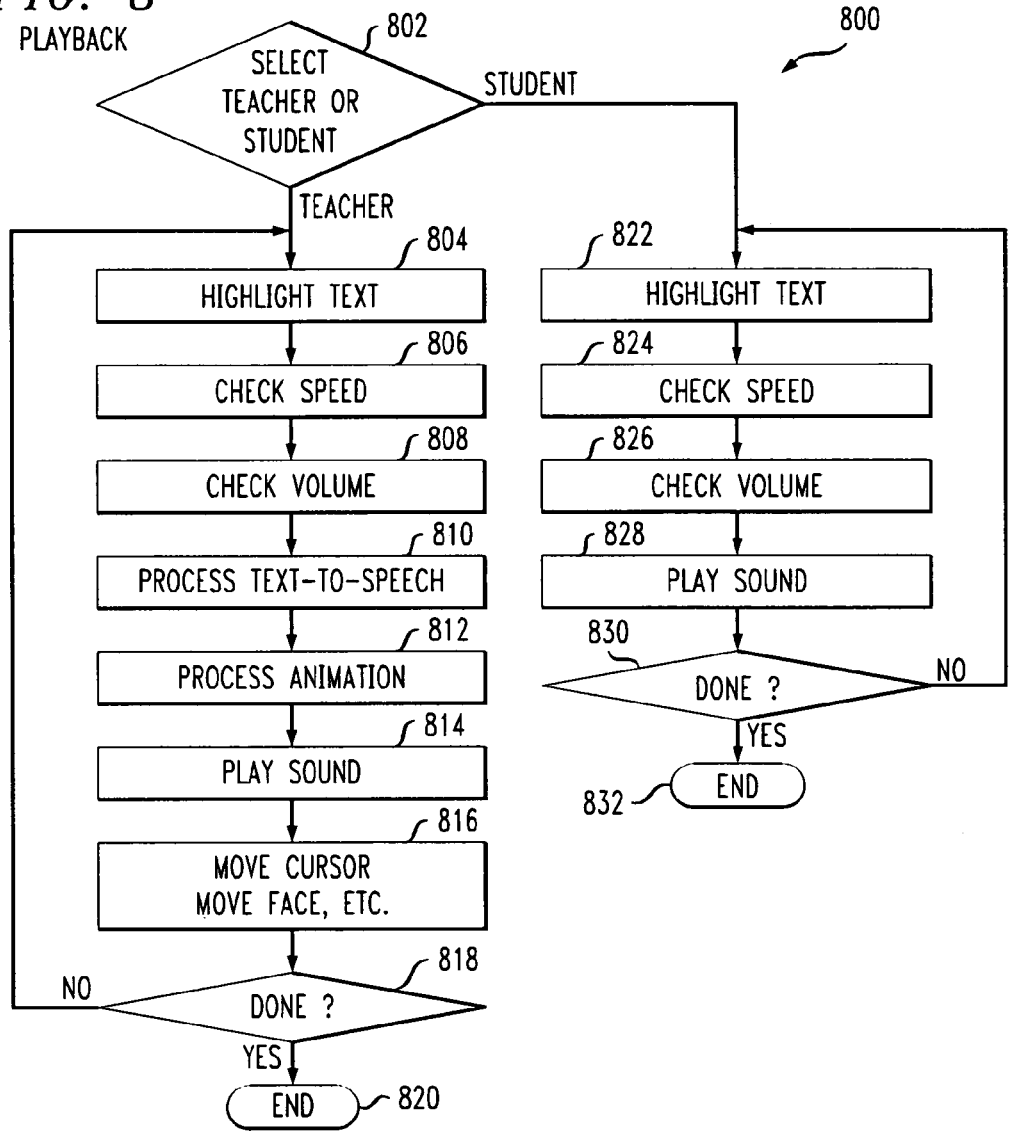
FIG. 8 is a detailed flowchart of a playback method according to the present invention.

Referring now to FIG. 8, a playback method is shown. In this regard, the method 800 first makes a determination whether a teacher is selected or a student is selected for playback (step 802). If a teacher is selected, text is highlighted (step 804), speed and volume are checked (steps 806 and 808), text-to-speech and process animation data is processed (steps 810 and 812) and the sound is played and animation moved (steps 814 and 816). A determination is then made whether the playback is complete (step 818). If not, steps 804 to 818 are repeated. If the process is complete, it is terminated (step 820).

If a student is selected at step 802, the text to be played back is highlighted (step 822). The speed and volume are then checked (steps 824 and 826). The sound, or recorded utterances of the student is played (step 828). A determination is then made as to whether playback is complete (step 830). If not, steps 822 to 830 are repeated. If the student playback is complete, the process is ended (step 832).

The student may also select to be evaluated to see how closely his or her pronunciation matches the teacher's model pronunciation. Automated Speech Recognition (utterance verification) and Verbal Information Verification (VIV) are used through modules 30, 32 and 32*a* (and associated elements) to determine accuracy in pronouncing words, word segments, sentences, or groups of sentences. In a preferred form, utterance verification would identify plosives such as "P" and "B" or "T" and "D". Scoring the accuracy includes but is not limited to: gross score for overall performance, score on individual sentences, score on individual words, and score on phonemes.

Such feedback to the student takes several forms and may be used to score performance, determine reinforcement, determine feature levels of the application (novice, intermediate, advanced). Feedback may be given explicitly or through a file sent to a teacher through output file storage 26 (FIG. 1), or both.

Overall scores include numeric values (for sentence groups, sentences, words, and sub-words) calibrated to account for the student's level such as novice, intermediate, expert, year of study associated with a syllabus to be used as a reference file, or other. The system may be set to display or not to display this score information to the student in the feedback area 64. The application can determine student's level through statistical information contained within the system or available over a network and student specific information collected while the student is interacting with the system, or by student level self-identification, or by teacher or therapist provisioning. Icons may be used to indicate level of performance for the student feedback including but not limited to a series of symbols such as stars, circles, etc. arranged in groups, and any of the many symbols frequently used to indicate successful task completion. An example would be to have three circles available. When the student needs some improvement, two would be shown. When the student needs more improvement to match the model, only one circle would be shown. When the student is successful in closely matching the model (based on pre-determined student level) all circles would be displayed. Color may be used to indicate level of performance.

Feedback on performance may be given while the student is reading the text or after task completion. While the student is reading the text, the Verbal Information Verification processing (or utterance verification processing) can be used to display real-time performance feedback. The system may use any number of graphical or audio cues to indicate performance including but not limited to bars, icons, colors, sound effects, or TTS text files. The system will indicate to the student that there is a problem and will help the student to decide if he or she should repeat the task, change the speed, move to another mode or feature such as word building, or listen to the teacher example again. Default options will be established based upon the specific performance issue and will be determined by, for example, the VIV feature.

Once a student has been practicing for some period of time, he or she can again request feedback. A summary can be created to provide feedback to the student including but not limited to highlighted words within text, overall scores, discrete scores for segments of work, icons to illustrate overall achievement, and audible feedback indicating performance. The audible feedback can be a sound effect such as a cheering crowd, or a can sound when a cursor is moved over a word that was not pronounced well. The student can play back and listen to the model and their own pronunciation for comparison.

A word and punctuation list can be used to practice pronunciation skills, review definitions, etc. The list may be created from a lesson file (e.g. lesson file 40), from a dictionary or other reference material, from the Internet (e.g. through input link 20), or from a list of sub-words, words, or groups (e.g. stored in pronunciation file 44) pronounced inaccurately by the student. One advantage to the system is that combinations of words and punctuation impact pronunciation and the system can identify these cases and provide feedback and reinforcement for these cases. For any case including for words that have been mispronounced, the system can arrange the words into an order such as closest match through not well matched and as a default, can present the items needing most work at the top of the list. Word lists appear in the working window. In the example given, a working window appears in the feedback area 64. The student can use a tool to scroll through the list. The student can highlight and select a word with a voice command or mouse. When the phoneme or word (or group) is highlighted, the teacher's voice is heard pronouncing the word. An optional feature on highlighting a sub-word, word, or group is to set the system to repeat the teacher's voice and also the student's voice for side by side feedback or to go to the recorded dictionary to play a sound file. The student can try to pronounce the word again at this point and get feedback. When the word is selected, the student can see a more detailed workspace feature in the window. The workspace feature uses language rules to process the sub-word, word, or group and display spelling, punctuation, stresses (accents), syllables, etc. The student can select to hear the example again and try to pronounce it. The student is scored again, and if performance is improved and feedback is satisfactory as determined by the student or teacher, the word lesson is ended. If not, more help may be given by the system.

If the student has trouble pronouncing the word with audible example and feedback, reinforcement is offered through the working window 60. Moving the cursor over a portion of the displayed sub-word, word, or group activates the default feature to pronounce it. This feature may be turned off. Selecting the word portion provides reinforcement windows with help for the student. An example of reinforcement help includes a message saying "Try this . . . in the word 'graduate' the 'd' is pronounced with a 'j' sound as in 'jar.'" With a table indicating known language rules for pronunciation, text messages are dynamically created based upon the circumstances within the selected sub-word, word, or grouping. The student sees the message in the window, and also hears the teacher speak the message.

Messages are nested by the system. If there are multiple linguistic reasons why a match is not made between the model and the student in a particular sub-word, word, or group case, then the messages are presented to the student in an order determined ahead of time. The most likely pronunciation rule is first, then less likely rules in a determined order.

An analysis of known errors of pronunciation will be used to assist the student. For example, there are known linguistic errors made by Korean students studying English. The 'Try this . . . " system of messages will include considerations for the user of the system and will present instructions most likely to help that particular student based upon student self-identification. Text or audible help for this feature may be presented in the native language or the target language, a combination, or both. For example, the pronunciation files 44 may include a table of sub-words and corresponding sub-words in another language. For word sound drill, for example, when learning a first language (given a student who natively speaks a second language), sub-words from the first language may be mapped to sub-words in the second language, to illustrate sound alike comparison to the student. The sub-word table will also be used to locate and display/play vocabulary words using the sub-word from either language. Another practice feature associated with the workspace is an option to list practice sub-words, words, or groups in a window, and permit practice of sounds relating to the specific problem encountered by the student. An example would be to highlight the area needing practice, such as "al." A list would be displayed with words containing this combination such as "'balk,' 'talk,' and 'walk.' The teacher would read the example, and the student could practice the words. Then the student could return to the original sub-word, word, or group being drilled, and continue to practice.

The student can review the lesson in any mode including teacher example, example and prompt, example, prompt and record, example, prompt, record, and compare.

The student lessons may be presented in a graphic illustration. The student can zoom in for further detail. The student can navigate around the content and highlight and select an area or detail to be studied. The student performance may be presented in telescoping graphical representations to provide access to all or portions of the session completed. The student can zoom in and refine skills, review complete sessions, or select portions. Higher levels will be illustrated with less detail. Zooming in will provide smaller pieces with more detail. The student can decide where in the lesson to begin from this overall graphical representation.

As to scoring and evaluation of the performance of a student, a variety of techniques and operations may be incorporated into the system. Scoring techniques are well known in the art. However, in a preferred form, customized scoring tables are generated with confidence scores as calibration points, as is known in automated speech recognition practice. For example, a series of sentences may be provided which represent the basic inventory of phonemes and diphones in a language. The student will read the sentences and they will be recorded. The sub-words will be analyzed to determine baseline score or starting performance of the student. This may be used to determine progress, to establish a level for exercises, or to identify areas to work on. A table of reference scores may also be provided for grade levels in language classes given populations of students. The student progress can be measured and graded on an individual basis or as compared with the population of choice.

Scores for a student speech are provided in sub-words, words, sentences, or paragraphs. Students may receive an overall score, or a score in individual parts of the speech.

Normalization issues regarding verification of speech are managed through an interface. Given speech of differing duration, and complexity, the animated cursor on the screen can be set by the system or by the student. When the student reads along with the animated cursor, the verification process can correlate the text which is highlighted with the sound file to be analyzed.

Certain recorded sounds can also be interjected for emphasis of natural sound for known sub-words or words of a given language. These words might be taken from previously recorded dictionary, application, or other resource.

Baseline scores can then be recorded in a table (such as shown in FIG. 1 at 52). The table 52 may take a variety of forms and is used to determine an appropriate level of a lesson or grading approach to be selected for the student. With this table, the system can automatically use the same text, content, etc. for students of different abilities by modifying thresholds of confidence measurement.

The student can also use a graphical user interface to establish or modify thresholds for the confidence measurement, grade level, or other attributes. To track his or her progress, the student registers an identification number, baseline score, and subsequent lesson scores to achieve customized lessons and to track progress.

Figure 9:
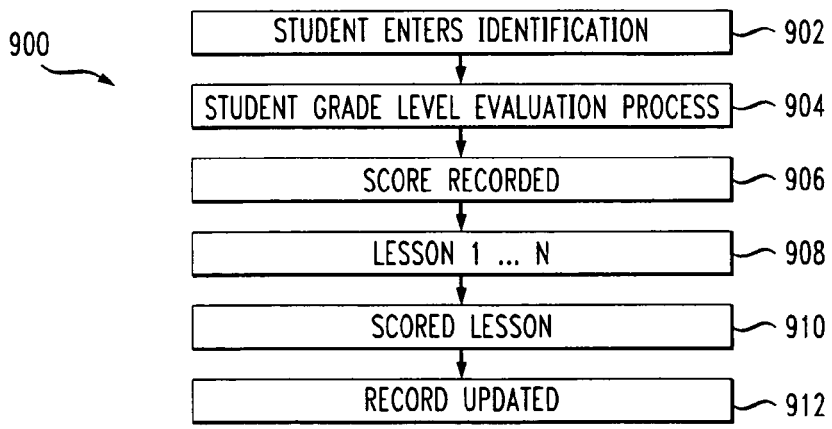
FIG. 9 is a flowchart illustrating a student registration method according to the present invention.

More specifically, FIG. 9 illustrates a preferred method for a student to so register. The method 900 is initiated by the entry of an identification number by the student (step 902). A student grade level evaluation process is then completed (step 904). A score is recorded (step 906) and a subsequent lesson is selected (step 908). The selected lesson is scored (step 910) and the student's record is updated (step 912).

Figure 10:
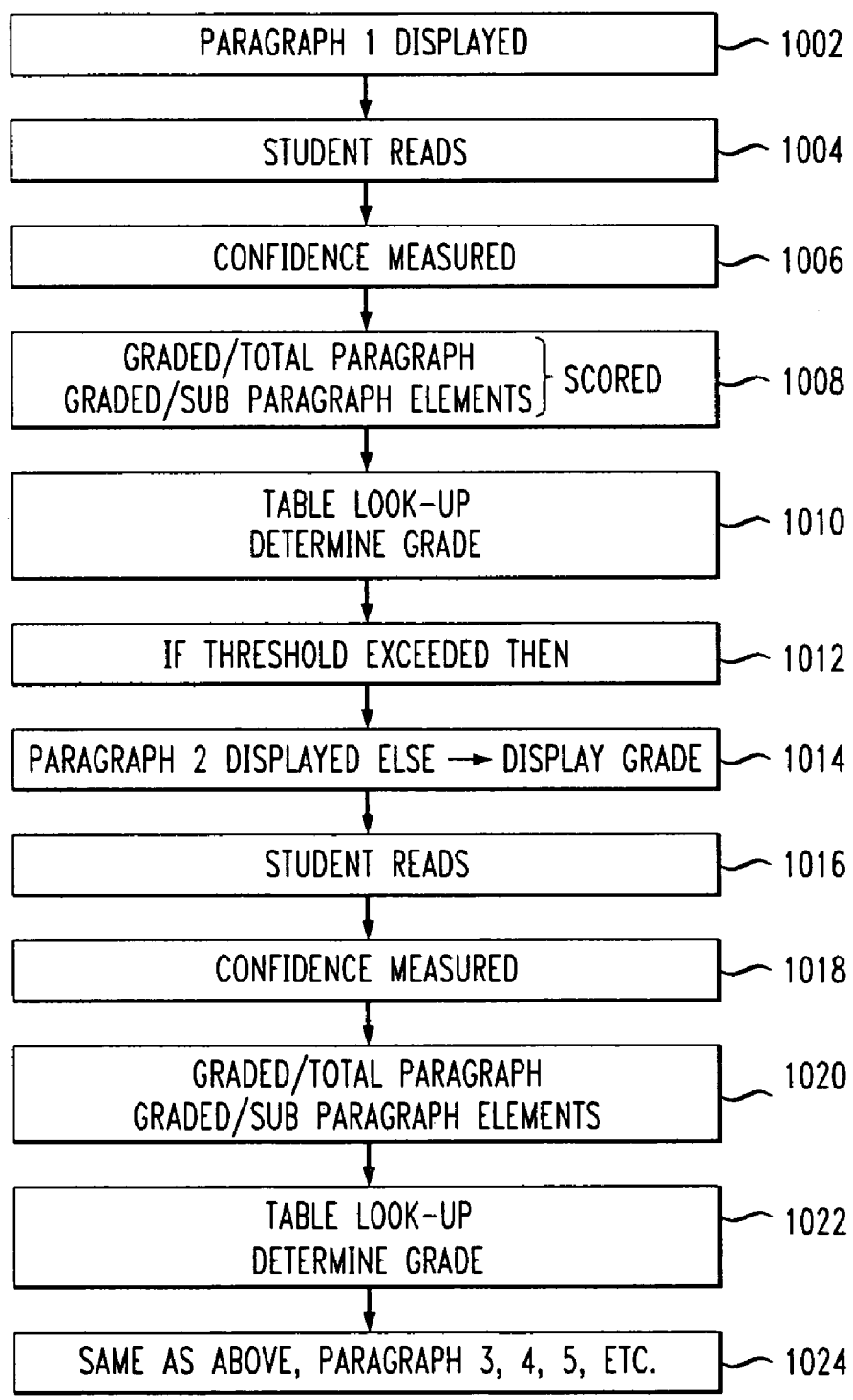
FIG. 10 is a flowchart showing a grade level evaluation (speech portion) according to the present invention; and, FIG. 11 is a flowchart showing a scoring example according to the present invention.

Referring now to FIG. 10, the student grade level evaluation process of step 904, for example, is detailed as a method 1000. In this process, a first paragraph is displayed (step 1002). The student reads the first paragraph (step 1004). A confidence score is measured by the system (step 1006). Grades are provided for the total paragraph as well as sub-paragraph elements (step 1008). The scores are compared to other scores using a table lookup (step 1010) to determine if a predetermined threshold is exceeded (step 1012). If the threshold is exceeded, then a second paragraph is displayed for evaluation or, if the threshold is not exceeded, the grade level is simply displayed (step 1014).

If the second paragraph is displayed, the student reads the second paragraph (step 1016) and a confidence level is measured (step 1018). A total paragraph and sub-paragraph score is obtained (step 1020) and, again, a table lookup is used to determine the grade or score (step 1022). The steps are repeated until the score obtained from the table lookup does not exceed the predeterminedthreshold (step 1024).

Figure 11:
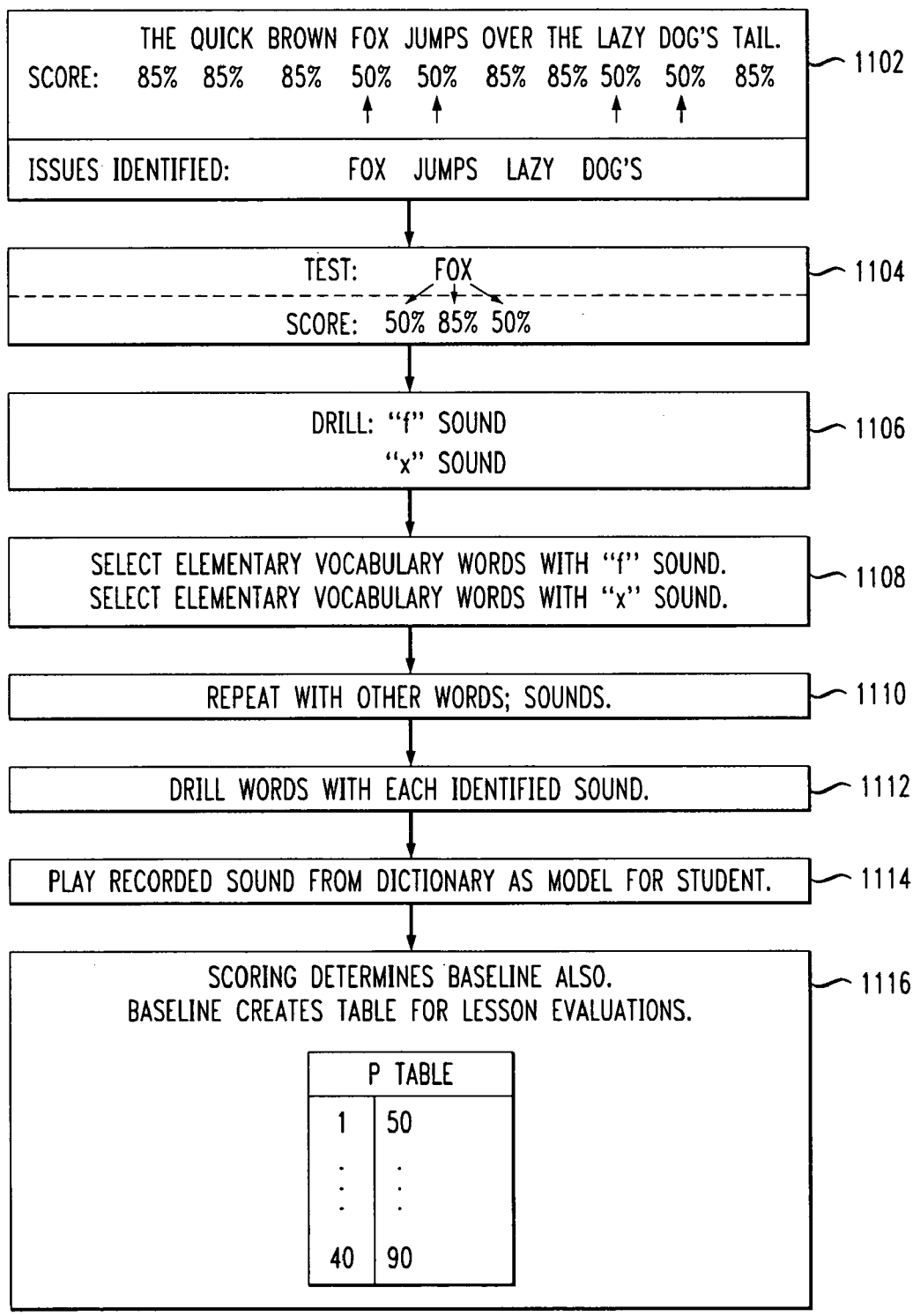

Referring now to FIG. 11, a scoring example 1100 for a lesson selected and scored in steps 908 and 910 is illustrated. The exemplary lesson has a score of ninety percent (90%) for an elementary level student. First, the student is requested to recite a sentence for which scores are given for each word of the sentence as illustrated (step 1102). These scores for each word identify words for which lessons should be given to the student. In the example shown, the word "fox" only received a 50 percent score so the student is further tested on the word "fox" (step 1104). The student's pronunciation of the letters of the word "fox" are then given scores and, in the example, the "f" and "x" sounds are determined to require further lessons (step 1106). Elementary vocabulary words with the "f" and "x" sound are respectively selected for lessons (step 1108). The same operation of steps 1104 to 1108 is repeated for other words or sounds that were given low scores (e.g. "jumps", "lazy" and "dog's") in the initial sentence in step 1102 (step 1110). A variety of words are then drilled in the lesson, including each identified sound (step 1112). If necessary, recorded sounds from the dictionary are played as model sounds for the student (step 1114). The lesson is then scored and a table is created for lesson evaluations (step 1116).

The system and method according to the present application provides many advantageous features and applications. Functions described above are combined to create feature rich applications for learning. The system includes scripted lesson combinations to enable any student to use the system with ease. With experience, the student or teacher can arrange for customized combinations of functions to help a specific student learning issue or learning style (and for creating individualized plans for compliance with PL94-142). The system will also recommend feature combinations based upon scores of the student and available functions associated with improving student skills. The system includes files with lessons tailored to helping students learn the basics of pronunciation for the target language. In addition, tables of references for the language, grammar, spelling, syntax, and pronunciation rules are included with their associated help messages for reinforcement learning. The flexibility of this system makes it an ideal tool for the classroom and for the adult student.

Directed learning experience—The basic system feature is to demonstrate language by processing text to speech and playing that speech to the student. The student can become familiar with the sound of the language to be learned. The student can listen to the examples and learn about pronunciation.

Listen to any word—With Text-To-Speech technology, the student can learn to imitate the language sound even when a native speaker is not available. Availability of recorded samples, lessons, etc. and the availability of a dedicated native speaker are constrained resources for students studying English, for example, in many environments. With Text-To-Speech, those constraints are eliminated. All materials on the web, any text file, and any prepared lesson becomes a multi-media language lesson. Any automatically generated text file may be used to create up-to-the-minute language lessons with this system. For example, by collecting closed captioning text from any movie, television or news program, text files may be created that can be used by the functions of the system as content.

Listening comprehension—The basic system feature of processing Text-To-Speech provides opportunities for a student to practice listening comprehension skills without requiring the production of special content, and without requiring another person to be present. In this case, the text may be hidden to improve the performance of the feature.

Example and prompt—By combining Text-To-Speech processing of the text, with the Facial Animation, an example is created for the student. Another feature of the system adds a prompt for the student to repeat the example. The student can use this feature of the system to hear an example and then practice without being recorded, graded, or receiving feedback from the system.

Example, prompt, record—The system can combine three functions to provide a means for the student to listen to the example, hear and or see a prompt of when to read and what to read, and to record his or her own efforts to say the sub-word, word, or phrase.

Example, prompt, record, playback—The system can combine functions to provide a means for the student to listen to the example, hear and or see a prompt, record speech, and then play back the example and the student speech for side by side comparison by the student.

Self selected reinforcement—If the student identifies a problem with a particular recorded sample and determines that help is needed, the student can access context specific help which is described in the function section workspace section. The student has accessed a help system that can identify the rules of the language associated with the word highlighted and can present the 'Try this . . . " series in a predetermined order based upon known student errors in the general population or in the group with which the student is identified. The student can view and listen to some or all of the reinforcement help messages.

Example, prompt, record, playback, compare, display results—One of the comprehensive features of this system includes the combination of the teacher example with audio and visual, options of altering appearance of the teacher, options of altering the sound characteristics of the teacher, seeing and or hearing a prompt, recording speech, allowing for playback to hear performance, using Automated Speech Recognition to process the student's spoken words, obtain a metric for performance, and then to display that performance within a flexible and adaptable frame of reference.

Grammar skills—With the addition of a word processing component, the language tutor can teach or reinforce grammar skills. The student can listen to a text passage and question, formulate an answer and speak or type the answer into the system. The results of the word processing program will generate examples of errors in sentence syntax, etc. that will be used by the system to recommend 'Try this. - - - " examples based upon known rules of the language. Problem areas will be highlighted as described above, and the student can use the working window to practice skills. Lessons on typical pronunciation issues for speakers of Asian languages when learning English are included in the system.

Several functions in the system may be combined to present lesson materials to the student. By combining several functions, the teacher can control the lesson plan, methods of teaching, and student feedback. This provides significant flexibility in the system and puts the user in control. Individualized Educational Plans can be easily constructed for students making compliance with PL94-142 simple for the teacher. An important feature of the system combines functions of Text-To-Speech and Facial Animation as a visual aid in pronunciation and typical facial, mouth, and tongue movements associated with speech using real examples from the lessons. This feature is valuable to students studying a language other than their native language and also to students working with a speech therapist.

Special interest or subject content might be desired in this circumstance. For example, an employee of a company dealing with automobile parts or an employee of a medical establishment might want to use content from the company literature to practice listening. Then he or she would be able to practice special words, phrases, etc. that he or she might be likely to hear in their environment, and therefore would be interested in understanding.

The above description merely provides a disclosure of particular embodiments of the invention and is not intended for the purposes of limiting the same thereto. As such, the invention is not limited to only the above described embodiments. Rather, it is recognized that one skilled in the art could conceive alternative embodiments that fall within the scope of the invention.

The invention claimed is:

1. A system for interactive language instruction comprising:
    a first module configured to receive repurposed input text from a repurposed source and convert the input text to audible speech in a selected language, the audible speech being patterned after a model;
    a user interface configured to receive utterances spoken by a user in response to a prompt to replicate the audible speech; and,
    a second module configured to recognize the utterances and provide feedback to the user, the feedback being comprised of a confidence measure reflecting a precision at which the user replicates the audible speech in the selected language based on a comparison of the utterances to one of the audible speech and the model, wherein the confidence measure is provided as scores for replication of at least one of paragraphs, sentences, words and sub-words; and
    a third module synchronized to the first module for producing a visual pronunciation aid in the form of an animated image of a human face and head pronouncing the audible speech.

2. The system as set forth in claim 1 wherein the animated image of the human face and head portrays a transparent face and head.

3. The system as set forth in claim 1 wherein the first and third modules further include user controls to control one of the speed of the animated image and the audible speech, and the vocal characteristics of the audible speech.

4. A system for interactive language instruction comprising:
    a first module configured to receive repurposed input text from a repurposed source and convert the input text to audible speech in a selected language, the audible speech being patterned after a model;
    a user interface configured to receive utterances spoken by a user in response to a prompt to replicate the audible speech;
    a second module configured to recognize the utterances and provide feedback to the user, the feedback being comprised of a confidence measure reflecting a precision at which the user replicates the audible speech in the selected language based on a comparison of the utterances to one of the audible speech and the model, wherein the confidence measure is provided as scores for replication of at least one of paragraphs, sentences, words and sub-words; and
    a mapping of sub-words in a first language to sub-words in a second language for illustrating sound alike comparisons to a student.

5. A system for interactive language instruction comprising:
    a first module configured to receive repurposed input text from a repurposed source and convert the input text to audible speech in a selected language, the audible speech being patterned after a model;
    a user interface configured to receive utterances spoken by a user in response to a prompt to replicate the audible speech; and, a second module configured to recognize the utterances and provide feedback to the user, the feedback being comprised of a confidence measure reflecting a precision at which the user replicates the audible speech in the selected language based on a comparison of the utterances to one of the audible speech and the model, wherein the confidence measure is provided as scores for replication of at least one of paragraphs, sentences, words and sub-words; and a record and playback module.

6. The system as set forth in claim 5 wherein the model is one of a predictive model, a diphone model, and a dynamically generated model.

7. The system as set forth in claim 5 wherein the first module includes files storing model pronunciations for words comprising the input text.

8. The system as set forth in claim 5 further comprising lesson files wherein the input-text is based on data stored in the lesson files.

9. The system as set forth in claim 5 wherein the system further includes dictionary files.

10. The system as set forth in claim 5 wherein the system further includes a table storing mapping information between word subgroups and vocabulary words.

11. The system as set forth in claim 5 wherein the system further includes a table storing mapping information between words and vocabulary words.

12. The system as set forth in claim 5 wherein the system further includes a table storing mapping information between words and examples of parts of speech.

13. The system as set forth in claim 5 wherein the system further includes tables of punctuation.

14. The system as set forth in claim 5 wherein the confidence measure comprises at least one of a numeric score, an icon, and an audio segment.

15. The system as set forth in claim 5 wherein the feedback further comprises audio playback.

16. A system for interactive language instruction comprising:

a first module configured to receive repurposed input text from a repurposed source and convert the input text to audible speech in a selected language, the audible speech being patterned after a model;

a user interface configured to receive utterances spoken by a user in response to a prompt to replicate the audible speech; and, a second module configured to recognize the utterances and provide feedback to the user, the feedback being comprised of a confidence measure reflecting a precision at which the user replicates the audible speech in the selected language based on a comparison of the utterances to one of the audible speech and the model, wherein the confidence measure is provided as scores for replication of at least one of paragraphs, sentences, words and sub-words; and a plurality of specific pronunciation files, each file of the plurality providing information associated with a different accent, set of proper names, trademarks or technical words.

17. A system comprising:

a first module configured to convert repurposed input text from a repurposed source to audible speech in a selected language, the audible speech indicative of a model;

a second module synchronized to the first module, the second module producing a visual pronunciation aid in the form of an animated image of a human face and head pronouncing the audible speech;

a user interface positioned to receive utterances spoken by a user in response to a prompt to replicate the audible speech; and, a third module configured to recognize the utterances and provide feedback to the user, the feedback being comprised of at least one of a score, an icon and an audio segment reflecting a precision at which the user replicates the speech in the selected language based on a comparison of the utterances to one of the audible speech and the model, wherein the feedback is provided for replication of at least one of paragraphs, sentences, words and sub-words.

18. A method for voice interactive language instruction comprising:

receiving repurposed input text from a repurposed source of text;

converting the input text data to audible speech data;

generating audible speech comprising phonemes based on the audible speech data;

outputting the audible speech through an audio output device;

generating a visual pronunciation aid in the form of an animated image of a face and head pronouncing the audible speech;

synchronizing the audible speech and the video image;

prompting a user to replicate the audible speech;

recognizing utterances generated by the user in response to the prompting;

comparing the audible speech to the utterances; and, providing feedback to the user based on the comparison, the feedback comprised of at least one of a score, an icon and an audio segment reflecting a precision at which the user replicates the audible speech, wherein the feedback is provided for replication of at least one of paragraphs, sentences, words and sub-words.

19. The method as set forth in claim 18 further comprising receiving the input text from a repurposed source via one of a network, a scanner, and the internet.

20. The method as set forth in claim 18 wherein the feedback comprises providing a playback of selected portions of the audible speech and utterances.

* * * * *